US009363085B2

(12) United States Patent
Offenberg et al.

(10) Patent No.: US 9,363,085 B2
(45) Date of Patent: Jun. 7, 2016

(54) ATTESTATION OF DATA SANITIZATION

(71) Applicant: Seagate Technology LLC, Cupertino, CA (US)

(72) Inventors: Manuel A Offenberg, San Francisco, CA (US); Monty Forehand, Loveland, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 47 days.

(21) Appl. No.: 14/088,896

(22) Filed: Nov. 25, 2013

(65) Prior Publication Data

US 2016/0013944 A1 Jan. 14, 2016

(51) Int. Cl.
H04L 9/32 (2006.01)
G06F 21/64 (2013.01)
G06F 21/60 (2013.01)

(52) U.S. Cl.
CPC .............. *H04L 9/3247* (2013.01); *G06F 21/60* (2013.01); *G06F 21/64* (2013.01); *G06F 2221/2143* (2013.01)

(58) Field of Classification Search
CPC ....... H04L 9/3247; G06F 21/60; G06F 21/64; G06F 2221/2143
USPC ........................................................ 713/176
See application file for complete search history.

(56) References Cited

U.S. PATENT DOCUMENTS 6,212,600 B1  4/2001  Friedman
6,993,661 B1  1/2006  Garfinkel
7,581,118 B2  8/2009  McGovern
8,397,083 B1  3/2013  Sussland
8,433,901 B2  4/2013  Deatley
8,499,160 B2  7/2013  Little
(Continued)

FOREIGN PATENT DOCUMENTS

CA  2012040840 A1  4/2012
WO  2007047802 A2  4/2007

OTHER PUBLICATIONS

Kissel et al., Guidelines for Media Sanitization, Sep. 2012, National Institute of Standards and Technology, Gaithersburg, MD.
(Continued)

Primary Examiner — Mohammad W Reza
(74) Attorney, Agent, or Firm — Cesari & Reed, LLP; Kirk A. Cesari; Christian W. Best

(57) ABSTRACT

Systems and methods are disclosed for performing data sanitization at a data storage device (DSD). In an embodiment, a controller may direct a memory device to sanitize data by securely erasing the data, generate an attestation confirming that the data was successfully sanitized, and sign the attestation using an authentication key to create a signed attestation. In another embodiment, a circuit may direct a memory device to sanitize data based on the data sanitization instruction, generate a sanitization confirmation indicating that the data was successfully sanitized, and provide the sanitization confirmation including a first thumbprint and a second thumbprint to another device. Generating the sanitization confirmation may include processing a first storage encryption key to produce the first thumbprint, directing the memory device to obliterate the first storage encryption key, and processing a second storage encryption key to produce the second thumbprint.

25 Claims, 7 Drawing Sheets

(56) References Cited

U.S. PATENT DOCUMENTS

| | | | |
|---|---|---|---|
| 2004/0188710 A1* | 9/2004 | Koren | G11C 16/102 257/197 |
| 2006/0117183 A1* | 6/2006 | Hatano et al. | 713/176 |
| 2006/0143476 A1* | 6/2006 | McGovern | 713/191 |
| 2009/0063797 A1 | 3/2009 | Taguchi et al. | |
| 2009/0119341 A1* | 5/2009 | Fried et al. | 707/200 |
| 2013/0170644 A1* | 7/2013 | Lambert | 380/277 |

OTHER PUBLICATIONS

International Search Report, EP 14194805.9, Feb. 12, 2015, 5 pages.

* cited by examiner

ATTESTATION OF DATA SANITIZATION

SUMMARY

In an embodiment, an apparatus may comprise a controller configured to perform a data sanitization process including: direct a memory device to sanitize data by securely erasing the data, generate an attestation confirming that the data was successfully sanitized, and sign the attestation using an authentication key associated with the apparatus to create a signed attestation.

In another embodiment, an apparatus may comprise a circuit configured to direct a memory device to sanitize data based on a data sanitization instruction, generate a sanitization confirmation indicating that the data was successfully sanitized, and provide the sanitization confirmation including a first thumbprint and a second thumbprint to another device. Generating the sanitization confirmation may include processing a first storage encryption key to produce the first thumbprint, directing the memory device to obliterate the first storage encryption key, and processing a second storage encryption key to produce the second thumbprint.

In another embodiment, a method may comprise performing a data sanitization process including: directing a memory device to sanitize data by securely erasing the data, generating an attestation confirming that the data was successfully sanitized, and signing the attestation using a first private key of an asymmetric cryptography key pair to create a signed attestation.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, separated, exchanged, or removed without departing from the scope of the present disclosure.

Individuals or businesses may desire to securely store or erase data stored on a data storage device. For example, businesses may store sensitive data on a data storage device, and then later desire to dispose of the data storage device. Secure erasure of the data stored on the device may be important to protect proprietary business information, such as client records or research data, or any other private information. Such secure destruction of data may be referred to as data sanitization. Standard erasing or overwriting techniques may leave data traces that can be recovered or deciphered from a data storage medium. Conversely, data sanitization can include data destruction or obstruction methods specifically directed towards preventing recovery of data, such as by preventing decryption of encrypted data. It may be desirable to retain a record of data sanitization operations that have been performed, including evidence that a particular device was properly sanitized.

Figure 1:
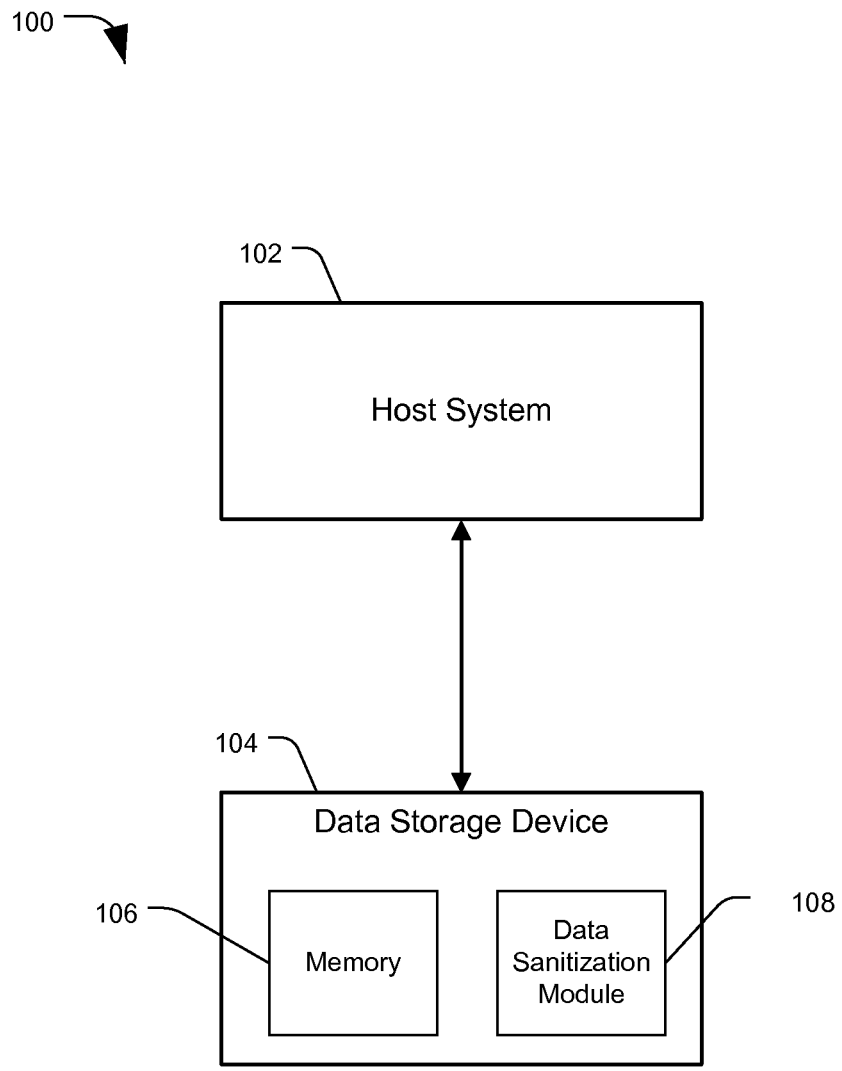
FIG. 1 is a diagram of an illustrative embodiment of a system for attestation of data sanitization.

FIG. 1 depicts an embodiment of a system for attestation of data sanitization, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. In an example embodiment, the DSD 104 may be a self-encrypting drive (SED) configured to encrypt data stored on the DSD. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a data sanitization module (DSM) 108. The memory 106 may comprise magnetic storage media such as disc drives, nonvolatile solid state memories such as Flash memory, other types of memory, or a combination thereof. The data sanitization module 108 may comprise a circuit configured to perform data sanitization operations on the memory 106, or the data sanitization module may be a programmable controller or processor configured to perform data sanitization operations based on software or firmware code. The DSD 104 may receive a data sanitization request from the host device 102, and use the DSM 108 to securely erase data from the memory 106 based on the data sanitization request.

Data sanitization operations performed by the DSM 108 may include securely erasing data stored on the memory 106. For example, the DSM 108 may direct the DSD 104 to overwrite data stored on a disk memory multiple times to prevent recovery of the data from the disk. In some embodiments, the DSM 108 may perform cryptographic data erasure, or crypto erase, to obliterate (e.g. by overwriting to make unrecoverable, which may include multiple overwrites) an old encryption key used to encrypt the data targeted for data sanitization, thereby making the encrypted data unrecoverable. Cryptographic erasure may include generating a new encryption key to replace the old encryption key. The DSM 108 may also generate or gather information related to data sanitization operations, and compile the information into a digital device data sanitization attestation (DDDSA), sometimes called a data sanitization form, attestation, or attestation form. The DSM 108 may further sign the attestation using an authentication key specific to the DSD 104, such as a private key of an asymmetric key pair. In some embodiments, a secret key securely shared between nodes may be used. In some embodiments, the key used to sign an attestation may be called an authentication key, device encryption key, secret encryption key, or private encryption key. Alternately, encryption keys used to encrypt data stored on the device and which may be destroyed during crypto erase operations may be called a storage encryption key, data encryption key, or media encryption key. The DSM 108 may perform additional operations related to data sanitization as discussed herein.

Figure 2:
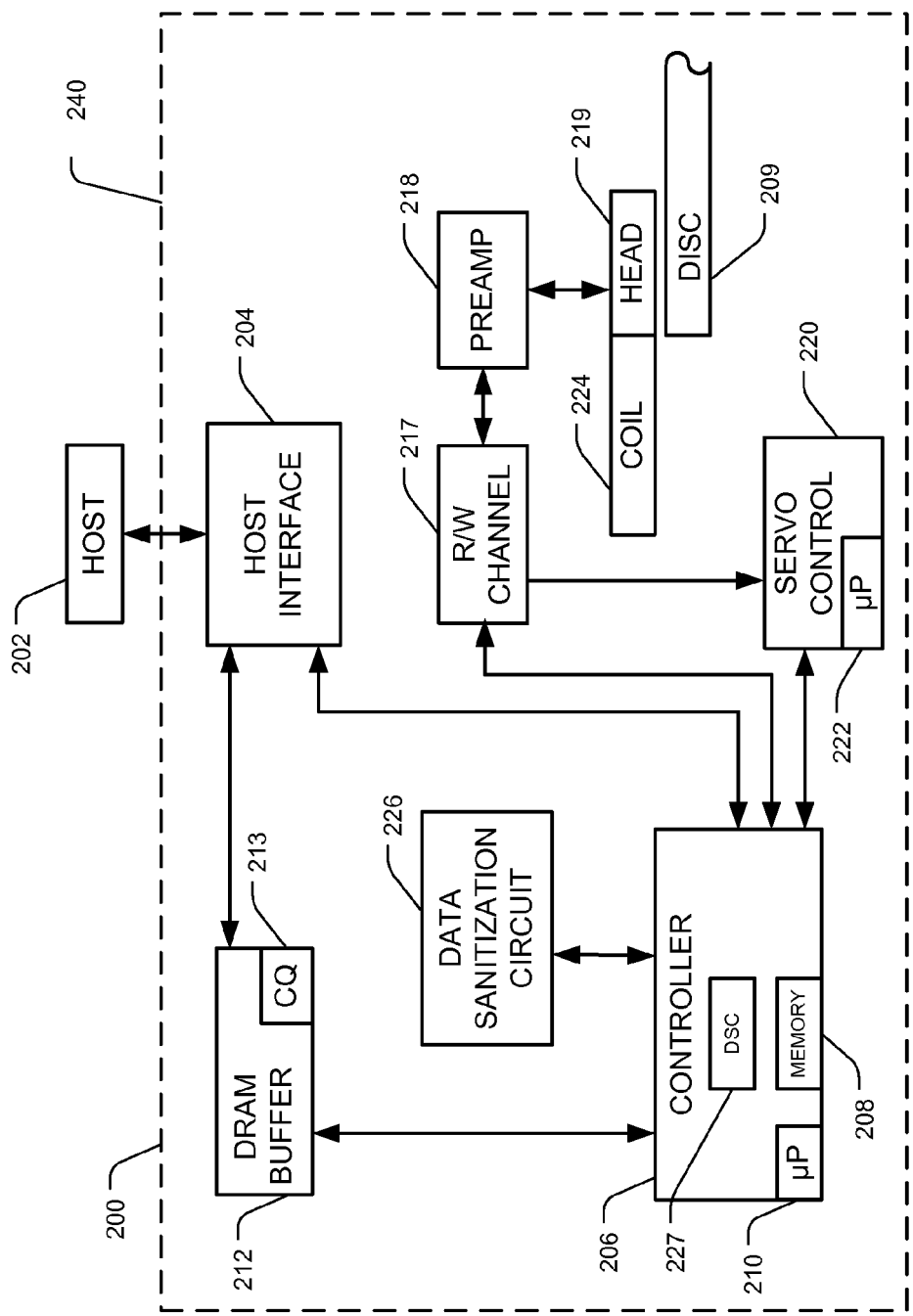
FIG. 2 is a diagram of another illustrative embodiment of a system for attestation of data sanitization.

FIG. 2 depicts another diagram of an embodiment of a system for attestation of data sanitization, generally designated 200. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206 with associated memory 208 and processor 210. In embodiments having one or more disk memories, FIG. 2 shows the DSD 200 can include a read-write (R/W) channel 217, which can encode data during write operations and reconstruct user data retrieved from disc(s) 209 during read operations. A preamplifier circuit (preamp) 218 can apply write currents to the head(s) 219 and provides pre-amplification of read-back signals. A servo control circuit 220 may use servo data to provide the appropriate current to the coil 224 to position the head(s) 219. The controller 206 can communicate with a processor 222 to move the head(s) 219 to the desired locations on the disc(s) 209 during execution of various pending commands in the command queue 213. In some embodiments, the DSD 200 may include solid state memory instead of or in addition to disc memory.

The DSD 200 may further include a data sanitization circuit 226. For example, the data sanitization circuit may correspond to the data sanitization module 108 depicted in FIG. 1. The circuit 226 may include a general purpose multiprocessor running an instruction set, an application specific integrated circuit (ASIC), a field programmable gate array (FPGA), other types of circuits, or any combination thereof. In some embodiments, a memory such as the disc 209, memory 208, or another memory may store instructions for performing data sanitization operations and related processes, and the sanitization circuit 226 may perform operations based on the stored instructions. In some embodiments, the data sanitization circuit may be a part of the controller 206, as depicted with DSC 227, or the controller may perform the data sanitization operations, for example using processor 210.

On an example embodiment, a data sanitization command is received at the DSD 200 from the host 202 over the interface 204. The data sanitization command may specify that all data stored to the DSD 200 be sanitized, that the data in specified bands or zones be sanitized, that specific files be sanitized, that other memory areas or files be sanitized, or any combination thereof. For example, in an embodiment employing crypto erase, a DSD 200 may use a different data encryption key to encrypt each band of a disk memory. The data sanitization command may direct that a specified band be securely erased, and the DSD 200 may accordingly delete the corresponding data encryption key and generate a new key for the specified band. In some embodiments, DSDs may have separate data encryption keys for different memories, subareas of memories, logical sets of files, individual files, or any combination thereof.

In addition to specifying what data to sanitize, the data sanitization command may include information corresponding to the data sanitization command. For example, a host 202 may be required to provide authentication information to establish a right to invoke a data sanitization command. Authentication information may include provided user names, password, host ID information, user ID information, biometric data, a security key, other authentication information, or any combination thereof. In some embodiments, authentication information may be provided prior to invoking a data sanitization command. The host 202 may also provide information such as identifying a user invoking the command, a business invoking the command, the type of sanitization operation to be performed (e.g. crypto erase, overwriting, block erase, degaussing, media destruction, or other methods), other information, or a combination thereof. In some embodiments, a host 202 may send a data sanitization command, and the DSD 200 may then request additional information regarding the command.

In response to the data sanitization command, the DSD 200 may initiate a data sanitization operation. For example, the DSD 200 may pass operation to data sanitization circuit 226. In an example embodiment employing a cryptographic erase operation, the DSD 200 may securely erase a data encryption key used to encrypt and decrypt the data identified in the data sanitization command, for example by overwriting the key multiple times to prevent recovery. The DSD 200 may generate a new data encryption key to replace the erased data encryption key, for example if the entire memory or areas of memory were cryptographically erased.

The DSD 200 may compile data regarding the data sanitization operation into a sanitization form, or attestation. For example, the attestation may include information provided by the host invoking the data sanitization, such as a requesting user, business, or other information. In addition, the sanitization form may include additional information about the operation, such as a serial number of the DSD 200, a manufacturer of the DSD, a date and time the sanitization was completed or begun, a data and time the sanitization command was received, a copy of the received data sanitization command, a method of sanitization employed, the files or areas of memory that were sanitized, a claim that the data was sanitized successfully or an error report about problems encountered, other information, or any combination thereof. The sanitization form can be used to verify where, when, why, and how the sanitization was performed, who requested it, and what device performed it.

After compiling the attestation information, the DSD 200 may sign the attestation using a key specific to the DSD. For example, the DSD 200 may use the private key of an asymmetric private-public key pair. The public key can be used to verify that the attestation was signed by the corresponding private key, and accordingly to verify that the sanitization operation was actually performed by the target device. Other signing methods may also be possible, such as hashing the attestation with a device's serial number or other ID, or with another secret key corresponding to the DSD 200. For example, a company or host device may share a symmetric digest key with one or more devices. The devices can use that key to create a keyed-hash message authentication code (HMAC or keyed digest) value over the attestation. The host may use the pre-shared digest key to validate the HMAC value over attestation. Other message authentication code (MAC) processes and algorithms may also be used.

Once the attestation has been compiled and signed by the DSD 200, the DSD may return the signed attestation to the host 202 along with or as a response indicating that the data sanitization operation has completed. In some embodiments, the DSD 200 may store the attestation locally, either signed or unsigned, and return the attestation when requested by a host 202.

In addition to the other information in the attestation, the DSD 200 may generate additional information regarding the sanitization operation or to provide proof of completion. For example, prior to securely erasing the old storage encryption key for the sanitized data, the DSD 200 may produce a first "fingerprint" or "thumbprint" of the key by performing or processing a cryptographic hashing algorithm on the key, or "digesting" the key. For example, a cryptographic hash could be applied to the key, which may generate a sequence of bytes identifying the original key. Once the old key has been securely erased and a new key generated, the DSD 200 may create a second fingerprint of the new key. The first fingerprint and the second fingerprint may be included as part of the attestation, or may be kept separate. Similarly, they can be left signed or unsigned by the DSD's private key, and may be returned to the host 202 automatically or only upon request.

Figure 3:
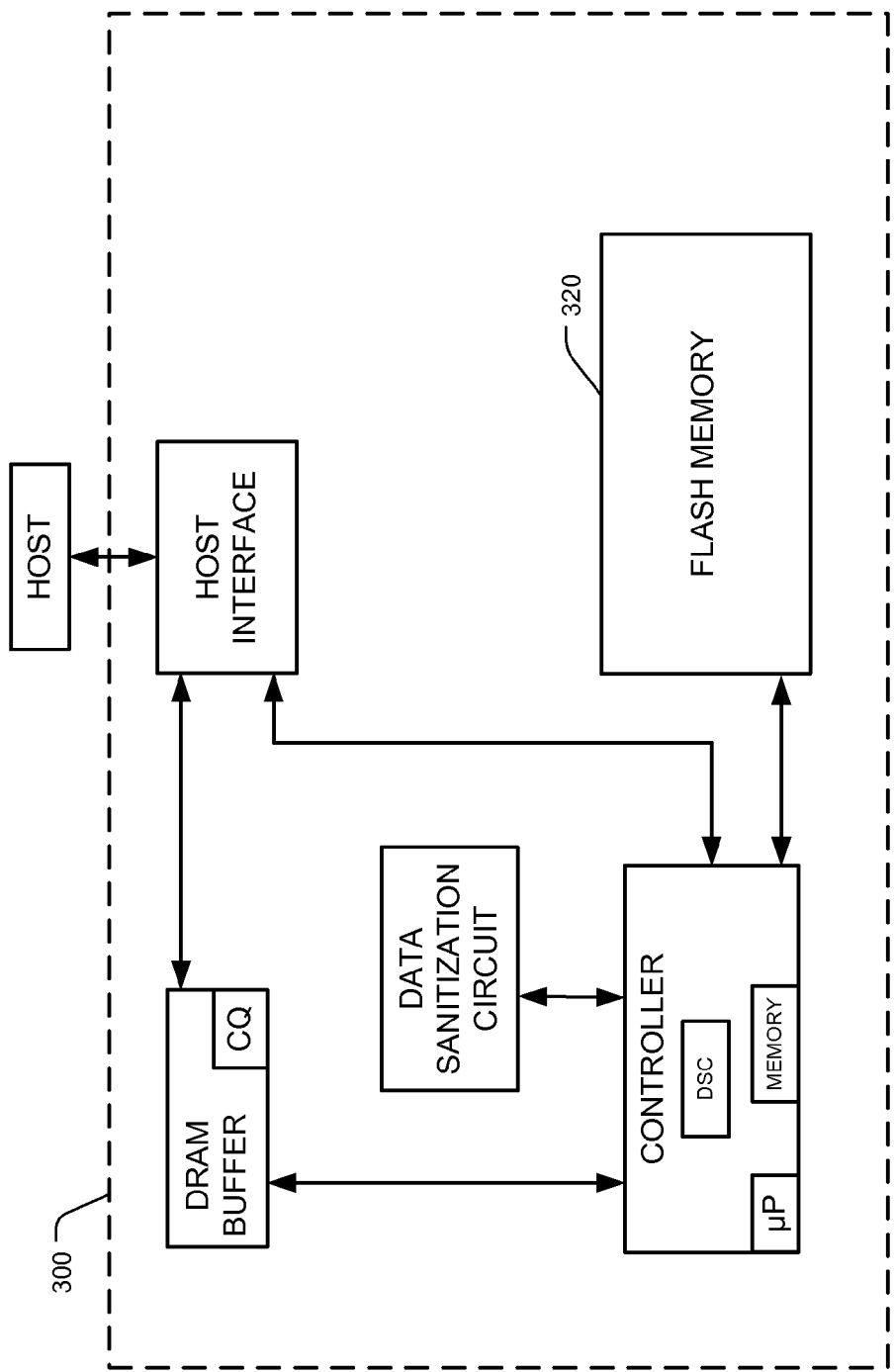
FIG. 3 is a diagram of another illustrative embodiment of a system for attestation of data sanitization.

FIG. 3 depicts another diagram of an embodiment of a system for attestation of data sanitization, generally designated 300. Specifically, FIG. 3 provides a functional block diagram of an example data storage device (DSD) 300. DSD 300 may include many or all of the components shown and described in FIG. 2, and the description of such components can be found in the description of FIG. 2. The DSD 300 may be a solid state drive (SSD) having nonvolatile solid state memory 320. Flash memory 320 is shown, but in some embodiments a non-solid-state memory such as a disc may be substituted, or a combination of solid state and non-solid-state memory may be used.

Figure 4:
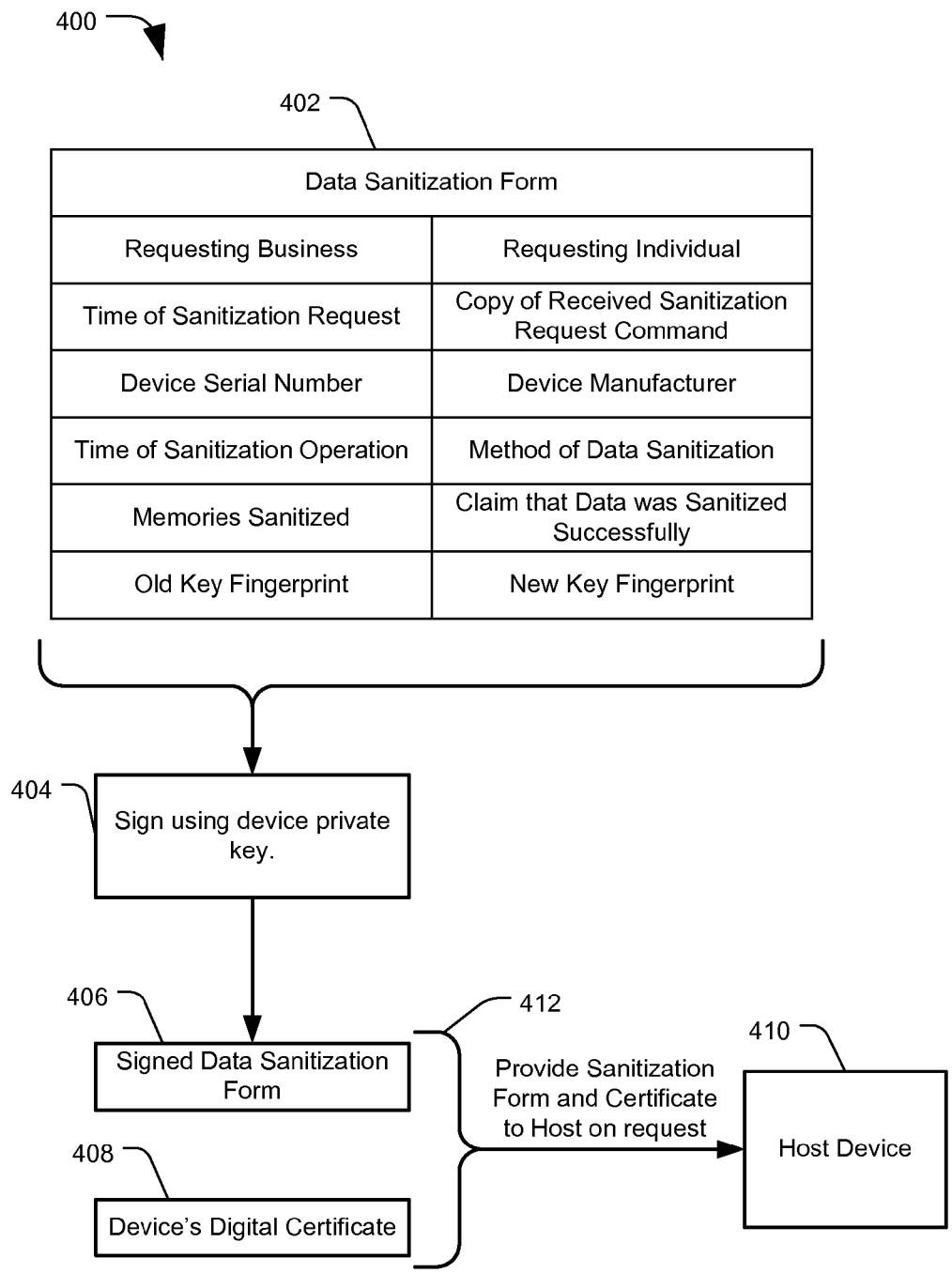
FIG. 4 is a diagram of another illustrative embodiment of a system for attestation of data sanitization.

Turning now to FIG. 4, a diagram of another illustrative embodiment of a system for attestation of data sanitization is shown and generally designated 400. FIG. 4 depicts a data sanitization form 402, which may also be referred to as an attestation or sanitization form. The data sanitization form 402 may include information relating to a data sanitization operation. For example, a data storage device (DSD) may receive a data sanitization command. The DSD, for example using a data sanitization module (DSM), may perform the data sanitization operation, as well as gather and compile information relating to the sanitization operation into a data package such as data sanitization form 402. Data included in the attestation may be used to verify that the sanitization was performed, when, by whom, or any other information.

The data included in the data sanitization form may include data provided by a host device as well as data from the device performing the data sanitization operation. For example, in addition to sending a data sanitization command, a host may also provide additional information. A host may provide information such as what business and individual is requesting the sanitization, or a device name, ID, or serial number of the requesting host. The host may provide a time stamp or similar identifier of when the request was submitted. The host may specify the interface or method of data sanitization to be employed, such as crypto erase, block erasure, or other methods. The DSD may also maintain a copy of the data sanitization request received from the host and include it into the attestation form. Other provided data, including additional or fewer data items, may also be included.

Other information included in the sanitization form may come from the DSD. For example, the sanitization form may include a serial number and manufacturer of the device, a method of sanitization employed (e.g. crypto erase, block erase, etc.), a listing of sanitized files or memory locations, and an assertion that the data was sanitized successfully. The form may also include a time that the sanitization operation was begun or completed. For example, the DSD may measure operations in clock ticks or system cycles, such as a number elapsed from when the sanitization command was received. The DSD may have an internal clock to track real time, may request a time signature from a host, or may access a time value from a network such as the internet. Other data, including additional or fewer data items, may also be included.

In an example embodiment employing cryptographic erase as a data sanitization method, a DSD may create fingerprints of one or more old keys and new keys. For example, after receiving the cryptographic erasure request, the DSD may digest the current key to produce a first fingerprint, and then securely erase the current key. The DSD may create a new key to encrypt future data, and digest the new key to produce a second fingerprint. The first and second fingerprints may optionally be included in the data sanitization form as additional evidence of the completed sanitization operation.

A DSD may digitally sign the attestation form using an authentication key specific to the DSD at 404, to produce a signed data sanitization form 406. For example, the DSD may use the device's private key of a public-private key pair of a public-key cryptosystem, also called asymmetric cryptography. In asymmetric cryptography systems, the public key is an encryption key which does not need to be kept secure, and which is linked to a specific secret or private key, which is kept secure. The public key can be used to encrypt data, which can then be decrypted only by the associated private key. The private key can be used to digitally sign data, and the public key, in turn, can be used to verify data signed by the private key. Examples of public key cryptography systems include RSA and elliptic curve cryptography (ECC).

In order to verify the digital signature on data, the recipient may need the public key corresponding to the signing private key. A public key may be provided in a digital certificate 408, also called a public key certificate or identity certificate. Digital certificates are often electronic documents containing a device's public key, and digitally signed using the private key of a trusted certificate authority (CA). The recipient may either already have a copy of the CA's public key, or may obtain it by retrieving the public key infrastructure (PKI) certificate chain. The PKI certificate chain can be stored, e.g. at a web site, on a server, or in a system's browser. A device's digital certificate provides an assurance that the identified public key and device are authentic, backed by the signature of the CA. The public key certificate may also include additional information, such as a device's serial number, the name of the CA, algorithms used in encrypting, hashing, or signing documents, or other information. In some embodiments, a certificate may include fields for including additional data. For example, key thumbprints or even the sanitization form 406 may be included in a digital certificate 408. A host may obtain a device's public key from other sources, such as other devices on a network, from a manufacturer of the device, or from a CA which has approved a certificate for the device. For example, a manufacturer of the device may also be a certificate authority.

The DSD may package a copy of its digital certificate 408 along with the signed data sanitization form 406, as shown at 412, or they may be stored and transferred individually. The signed sanitization form 406 and certificate 408 may then be sent to a host 410. For example, they may be sent as two individual files, either in a single transmission or multiple transmissions, or the sanitization form 406 may be included into a certificate, or some other combination. The DSD may store the data sanitization form 406, and provide the form 406, the digital certificate 408, or both to the host 410 on request. In some embodiments, the sanitization form 406, the device's certificate 408, or both may be sent automatically to the host 410 requesting the data sanitization after the operation has completed. In some embodiments, the form 406 and certificate 408 may be retrieved by a host 410 besides the host that initiated the sanitization process. A host 410 may need to provide authority (e.g. a password authentication) for initiating the sanitization process, to obtain a copy of the sanitization form 406 or certificate 408, or both.

In some embodiments, the old key fingerprint and new key fingerprint may be included in the data sanitization form. In some embodiments, the fingerprints may be digitally signed by the DSD individually without inclusion into an attestation form. For example, a device may create an old key fingerprint and a new key fingerprint, digitally sign them, and send signed fingerprints to a host along with a digital certificate. In some embodiments, additional data in a sanitization form may not be included.

Figure 5:
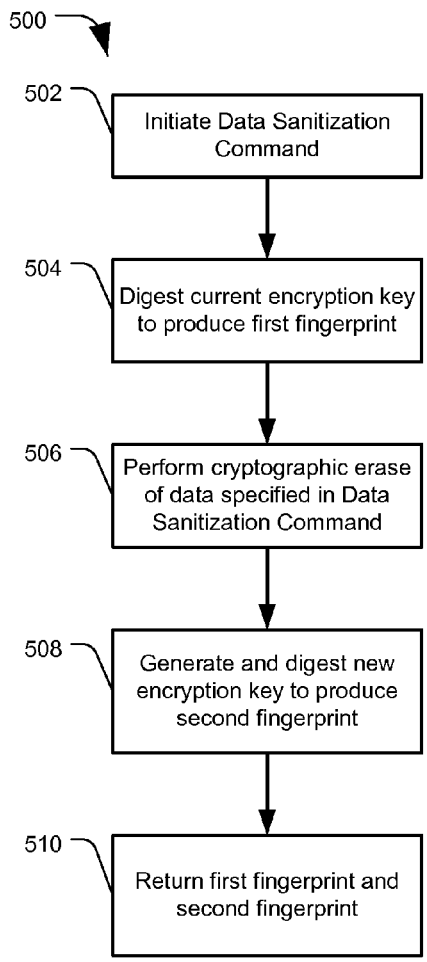
FIG. 5 is a flowchart of an illustrative embodiment of a method for attestation of data sanitization.

Turning now to FIG. 5, a flowchart of an illustrative embodiment of a method for attestation of data sanitization is shown and generally designated 500. A device may initiate a data sanitization command, at 502. For example, a data storage device (DSD) may receive a data sanitization command from a host and execute the command using a data sanitization module (DSM). In an embodiment where cryptographic erasure is employed, the device may digest the current storage encryption key which was used to encrypt the data targeted for sanitization at 504, for example by applying a cryptographic hash function to the current key. The output of the digest operation may be a first fingerprint. In some embodiments, the sanitization operation may include data corresponding to multiple storage encryption keys. In such embodiments, the DSD may digest each storage encryption key and produce a first set of fingerprints. For simplicity, it will be assumed that a single current storage encryption key is to be digested.

The DSD may perform a cryptographic erase of the data, media, or portions of media specified in the data sanitization command, at 506. As explained herein, this may involve securely erasing or overwriting the current storage encryption key to prevent recovery of the key. At 508, the DSD may generate a new storage encryption key to replace the erased storage encryption key. The DSD may also digest the new storage encryption key to produce a second fingerprint.

The DSD may then return the first fingerprint and the second fingerprint to a host which requested the data sanitization operation, at 510. In some embodiments, the fingerprints may be returned automatically on completion of the operation. The fingerprints may also be requested by a host device at another time. In some embodiments, the fingerprints may be digitally signed by the DSD. Signed fingerprints may be provided to a host along with the device's digital certificate, the fingerprints may be included as part of the digital certificate and the certificate returned to the host, or the fingerprints may be otherwise provided. In some embodiments, the fingerprints may be included as part of an attestation form, and signed along with the other data in the form.

Figure 6:
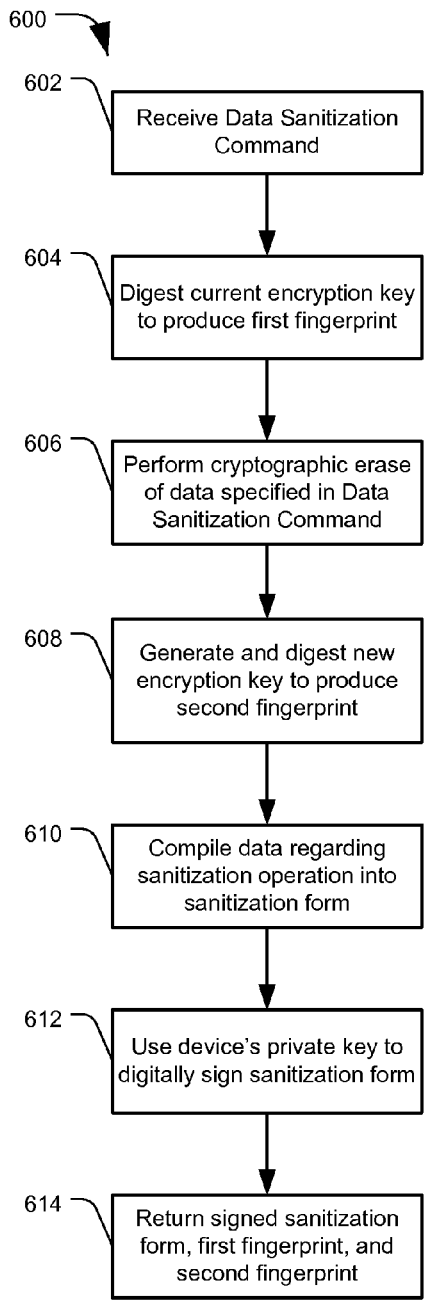
FIG. 6 is a flowchart of another illustrative embodiment of a method for attestation of data sanitization.

FIG. 6 depicts a flowchart of another illustrative embodiment of a method for attestation of data sanitization, generally designated 600. The method 600 may involve receiving a data sanitization command at a data storage device, at 602. The DSD may digest the current data encryption key to produce a first fingerprint, at 604. The DSD may cryptographically erase the target data, at 606. A new data encryption key may be generated and digested to produce a second fingerprint, at 608.

The DSD may compile data regarding the data sanitization operation into a sanitization form, at 610. For example, the DSD may use data acquired from a host and from the device itself to compile data, such as from the data sanitization form 402 depicted in FIG. 4. The data sanitization form may include the first fingerprint and the second fingerprint, or the fingerprints may not be included in the form. The DSD may apply its private key to the sanitization form to digitally sign the form, at 612. The signed sanitization form may be returned to a host, at 614. This may be the host that requested the data sanitization operation or another host, and may be performed automatically after completion of the operation or when requested by the host. The DSD may also return the first and second fingerprint, either as part of the sanitization form or separately. The DSD's digital certificate may also be provided along with the santization form or upon request.

In some embodiments, the DSD may not generate the first or second fingerprint. For example a host may specify whether or not to generate the fingerprints. In some embodiments, a host may specify a method of data sanitization that does involve erasing or generating cryptographic keys, and fingerprints may not be generated.

Figure 7:
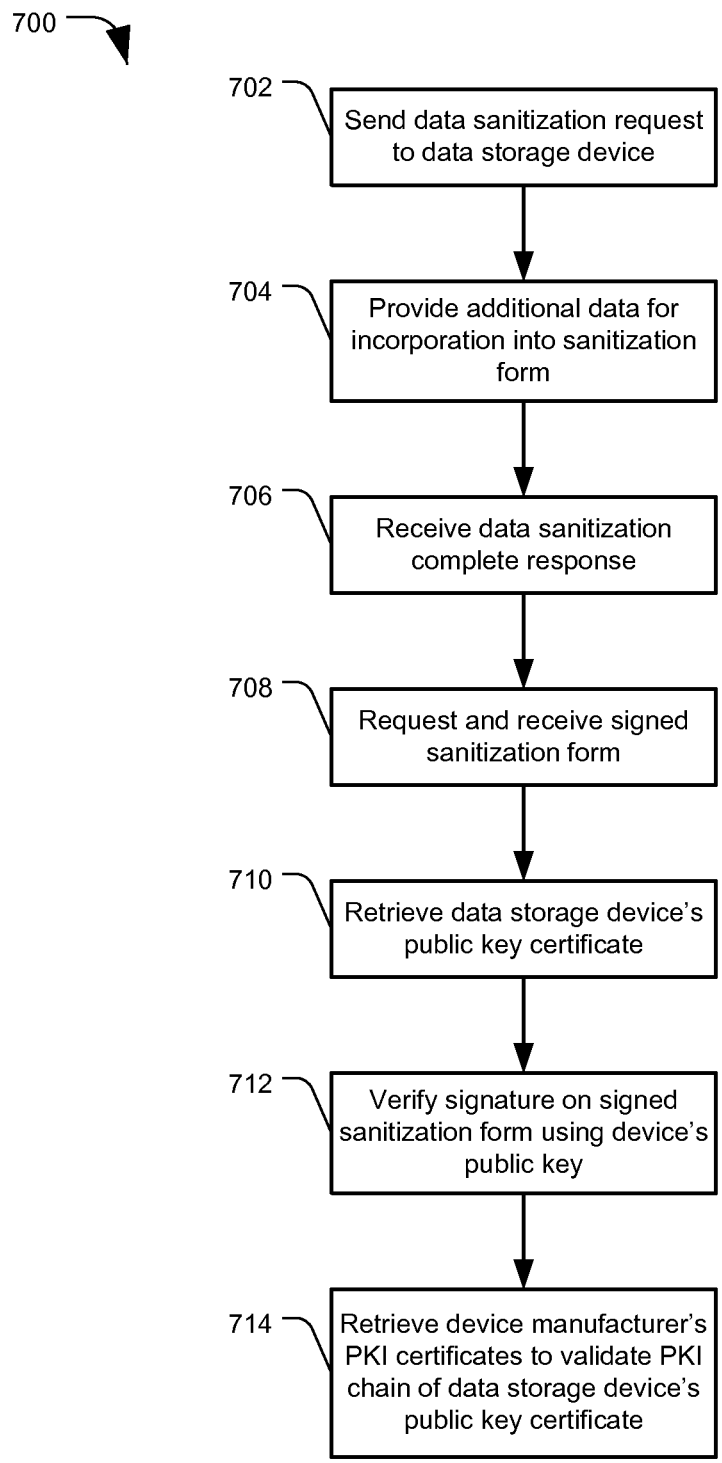
FIG. 7 is a flowchart of another illustrative embodiment of a method for attestation of data sanitization.

FIG. 7 depicts a flowchart of another illustrative embodiment of a method for attestation of data sanitization, generally designated 700. Method 700 may include sending a data sanitization request to a data storage device, at 702. The method 700 may involve providing additional data to the data storage device, for example for incorporation by the DSD into a data sanitization form, at 704. The additional data may be sent along with the initial data sanitization request, as a subsequent data transmission, or in response to a request for additional data from the DSD. Examples of additional data may include the method of data sanitization requested, a time of the sanitization request, a requesting individual, a requesting business, an authorizing supervisor, any other data, or any combination thereof.

The method 700 may include receiving a data sanitization complete response, at 706. The method 700 may also include requesting and receiving a signed data sanitization form from the DSD, at 708. In some embodiments, the data sanitization form may be received automatically from the DSD along with or instead of the data sanitization complete response, at 706. The signed data sanitization form may include data provided to the DSD at 704, and it may include additional data about the data sanitization operation from the DSD. For example, it may indicate a real time or relative time (e.g. a number of clock ticks since the sanitization command was received) indication of when the sanitization operation completed, a device manufacturer, device serial number, an indication of memories or files sanitized, fingerprints for old and new data encryption keys, other data, or any combination thereof. The data sanitization form may be digitally signed, for example using the DSD's private key of an asymmetric key pair.

The method 700 may include retrieving the DSD's public key certificate, at 710. For example, the DSD may provide a copy of its digital certificate with the data sanitization form, at 708, or in response to a request at 710. In some embodiments, the DSD's digital certificate may be acquired from another source, for example over the internet or network from another device, from a certificate authority, or from another source.

The method 700 may involve verifying the signature on the signed sanitization form using the DSD's public key, at 712. In some embodiments, the method 700 may also include validating the PKI chain for the DSD's public key certificate, at 714. For example, if the device manufacturer is a certificate authority, the manufacturer may have created the device's digital certificate by including the device's public key in the certificate and signing the certificate with the manufacturer's private key. In some embodiments, there may be chain of certificates, with higher CAs issuing digital certificates for lower CAs, and the lower certificate authorities issuing certificates for devices or lower authorities in turn. For example, under various certificate protocols, such as Certificate Management Protocol (CMP) or Online Certificate Status Protocol (OCSP), the device's certificate may identify the issuing CA, information on revoked keys or CAs, where the CA's certificate can be obtained (e.g. web locations or other sources), other certification chain validation information, or any combination thereof. If the issuing CA is not already on a trusted CA list of a host executing method 700, the host may obtain the digital certificate of the issuing CA. That certificate may in turn identify a higher CA. This chain may be followed up to a root CA, which can provide a certificate signed by its own private key. Following this chain allows a host to verify the signatures of each CA in the chain and be provided with greater assurance that each certificate in the chain is authentic. In an example embodiment, some or all of the certificates in the PKI chain may be stored on the data storage device and accessible to the host. Some or all of the certificates in the chain may also be obtained from other devices in a network, on the internet, already stored in the host, or otherwise accessible.

Figure 8:
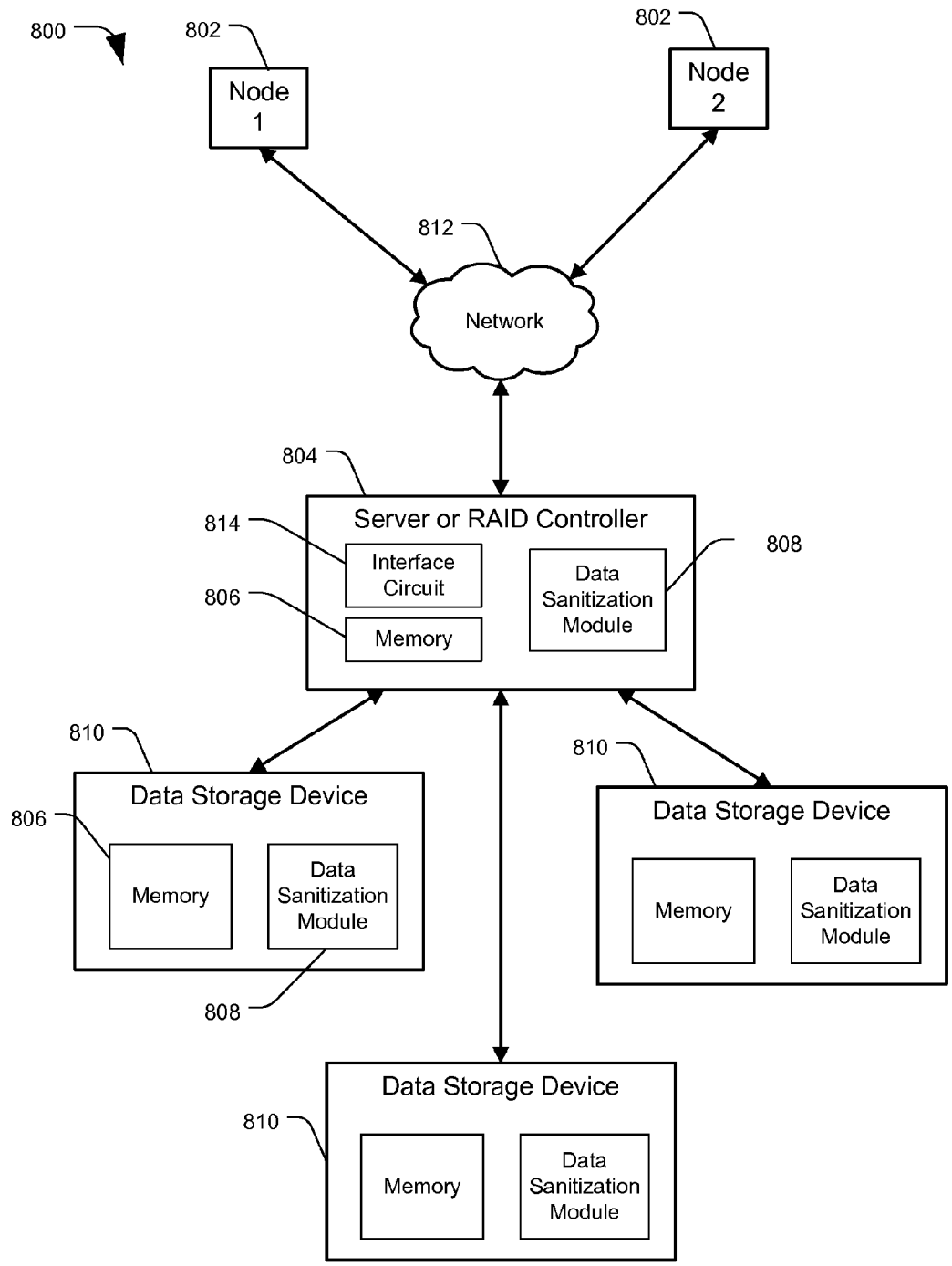
FIG. 8 is a diagram of another illustrative embodiment of a system for attestation of data sanitization.

Turning now to FIG. 8, a diagram of another illustrative embodiment of a system for attestation of data sanitization is shown and generally designated 800. The system 800 may include one or more nodes 802 connected to a server or RAID controller 804 over a network 812. For example, the network 812 may be any wired or wireless network, such as a local area network (LAN), a wide area network (WAN), an internet, or an intranet. Nodes 802 may be individual work stations or user devices such as computers, mobile phones, tablets, or other devices. The server or RAID controller 804 may be a computer, circuit, or other device controlling or in communication with one or more data storage devices 810. For example, the server or RAID controller 804 may include a server hosting internet websites, services, and remote storage, such as may be available in a cloud computing-based distributed computing environment. The server or RAID controller 804 may include one or more interface circuits 814. For example, the server or RAID controller 804 may include a network interface to connect to network 812, and a memory device interface to connect to data storage devices 810.

The server or RAID controller 804 and one or more data storage devices 810 may include a memory 806, which may correspond to memory 106 of FIG. 1, and a data sanitization module 808, which may correspond to data sanitization module 108 of FIG. 1. A node 802, such as a user computer connected to the internet, may send a data sanitization request over the network 812 to server or RAID controller 804. The target data of the data sanitization request may be stored on memory 806 of the server or RAID controller 804 or of the one or more data storage devices 810.

If the target data is contained in the memory of server or RAID controller 804, the server or RAID controller may sanitize the data, for example using the data sanitization module 808. This may include securely erasing the data, producing storage encryption key fingerprints, producing an attestation, signing sanitization confirmation data with a private key, and returning confirmation information to the requesting node 802. A public key certificate of the Server or RAID controller 804 may also be provided to the requesting node 802.

If the target data is contained in the memory of the one or more data storage devices 810, the server or RAID controller may direct the target data storage device 810 to sanitize the data, for example using the data sanitization module 808 of the data storage device 810. The server or RAID controller 804 may also send information received from the requesting node 802 or generated at the server 804 to include in an attestation produced by the data storage device 810. The data storage device 810 may, in turn, securely erase the data, produce key fingerprints, produce an attestation, or sign confirmation data using a private key of the data storage device 810. The data storage device 810 may provide the server 804 with a certificate containing the DSD's 810 public key.

The server 804 may verify the DSD's 810 signature on the attestation, for example by following a PKI chain to a trusted certificate authority (CA). In some embodiments, the server 804 may pass along the fingerprints, signed attestation, or device certificate for the DSD 810 to the requesting node 802 without performing any verification. In some embodiments, the server 804 may receive the attestation, fingerprints, or other data from the DSD 810 unsigned. The server 804 may create an attestation using data from the DSD 810 or requesting node 802, and sign the attestation using the server's 804 private key. In some embodiments, the server 804 may receive a signed attestation from the DSD 810 and may sign it again using the server's 804 private key. In some embodiments, a system may include a chain of servers or RAID controllers 804 and data storage devices 810, and multiple devices in the chain may sign an attestation as it is returned to a node 802. The server 804 may return one or more device certificates necessary to verify each signature on the attestation.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   an interface to communicate with a host device;
   a controller configured to perform a data sanitization process including:
   receive a data sanitization command from the host device via the interface directing the controller to sanitize specified data by employing methods to prevent recovery of data that may otherwise be recoverable after employing standard erase operations;
   direct a memory device to sanitize the specified data by securely erasing the specified data;
   generate an attestation confirming that the specified data was successfully sanitized, including:
   process a first storage encryption key to produce a first thumbprint;
   direct the memory device to obliterate the first storage encryption key;
   process a second storage encryption key to produce a second thumbprint;
   sign the attestation using an authentication key associated with the apparatus to create a signed attestation; and
   provide the signed attestation including the first thumbprint and the second thumbprint to the host device.

2. The apparatus of claim 1 further comprising:
   the attestation includes data specifying a manner in which the data was securely erased.

3. The apparatus of claim 1 further comprising the authentication key includes a private key of an asymmetric cryptography key pair.

4. The apparatus of claim 1 further comprising:
   the controller configured to:
   receive information from the host included with the sanitization command, including information identifying the entity submitting the data sanitization command; and
   incorporate the information into the attestation.

5. The apparatus of claim 4 further comprising:
   the attestation includes a time related to the data sanitization command.

6. The apparatus of claim 1 further comprising:
   the controller configured to:
   receive authentication information from a host device; and
   provide the signed attestation to the host device after verifying the authentication information.

7. The apparatus of claim 1 further comprising:
   the controller directs the memory device to securely erase the data by overwriting a first storage encryption key used to encrypt the data.

8. The apparatus of claim 7, the controller further configured to:
   perform a hashing algorithm on the first storage encryption key to produce first thumbprint;
   generate the second storage encryption key to replace the first storage encryption key; and
   perform a hashing algorithm on the second storage encryption key to produce the second thumbprint.

9. The apparatus of claim 1 further comprising:
   the attestation includes a unique identifier of the apparatus and a manufacturer indicator of the apparatus.

10. The apparatus of claim 1 further comprising:
    the memory device;
    the controller configured to:
    verify that the data has been securely erased;
    provide the attestation to a host device when it is determined that the data has been securely erased; and
    provide a certificate of the apparatus including a public key of the apparatus.

11. The apparatus of claim 1 further comprising:
    the interface is a network interface;
    the controller is a data storage controller and is configured to execute the data sanitization process based on the data sanitization command;
    a memory device interface circuit configured to provide communication between the controller and the memory device; and
    the memory device includes at least one of multiple separately removable data storage devices coupled to the memory device interface circuit.

12. The apparatus of claim 11 further comprising:
    the controller further configured to generate the attestation by instructing the memory device to provide the attestation.

13. The apparatus of claim 12 further comprising:
    the controller further configured to direct the memory device to provide a signature with the attestation using a private key of the memory device.

14. An apparatus comprising:
    an interface to communicate with a host device;
    a circuit configured to:
    receive a data sanitization instruction from the host device via the interface directing the circuit to sanitize data by employing methods to prevent recovery of data that may otherwise be recoverable after employing standard erase operations;
    direct a memory device to sanitize the data based on the data sanitization instruction;
    generate a sanitization confirmation indicating that the data was successfully sanitized including:
    processing a first storage encryption key to produce a first thumbprint;
    directing the memory device to obliterate the first storage encryption key;
    processing a second storage encryption key to produce a second thumbprint; and
    provide the sanitization confirmation including the first thumbprint and the second thumbprint to another device.

15. The apparatus of claim 14 further comprising:
    the second storage encryption key is generated to replace the first storage encryption key for use in data encryption;

the sanitization confirmation is a data package including:
  the first thumbprint and the second thumbprint;
  a unique identifier of the apparatus; and
the circuit further configured to sign the sanitization confirmation using a private key separate from the first storage encryption key and the second storage encryption key.

16. The apparatus of claim 15 further comprising:
the circuit directs the memory device to obliterate the first storage encryption key using methods to prevent recovery of data that may otherwise be recoverable after employing standard erase operations; and
the sanitization confirmation further including a unique identifier of a requester requesting the data sanitization.

17. The apparatus of claim 16 further comprising:
the sanitization confirmation further including a time indicator for the data sanitization.

18. The apparatus of claim 17 further comprising:
the sanitization confirmation further including a copy of a received data sanitization command.

19. The apparatus of claim 18 further comprising:
the sanitization confirmation further including an identifier of memory locations that have been sanitized based on the data sanitization instruction.

20. A method comprising:
performing a data sanitization process including:
  receiving a data sanitization command from a host device to sanitize specified data by employing methods to prevent recovery of data that may otherwise be recoverable after employing standard erase operations;
  directing a memory device to sanitize the specified data by securely erasing the specified data;
  generating an attestation confirming that the specified data was successfully sanitized, including:
    processing a first storage encryption key to produce a first thumbprint;
    directing the memory device to obliterate the first storage encryption key;
    processing a second storage encryption key to produce a second thumbprint;
    signing the attestation using a first private key of an asymmetric cryptography key pair to create a signed attestation; and
  provide the signed attestation including the first thumbprint and the second thumbprint to the host.

21. The method of claim 20 further comprising:
generating the attestation to contain data including:
  a manner by which the data was securely erased;
  data identifying a device generating the attestation; and
  information provided by the host device.

22. The method of claim 20, the data sanitization process further comprising:
  producing the first thumbprint by performing a hashing algorithm on the first storage encryption key used to encrypt the data;
  producing the second thumbprint by perform a hashing algorithm on the second storage encryption key generated to replace the first storage encryption key; and
  performing a cryptographic erasure on the data.

23. The method of claim 22 further comprising:
  receiving data sanitization request over a network interface; and
  executing the data sanitization process based on the data sanitization request, the data sanitization process further including:
    selecting the memory device having the data from multiple data storage devices.

24. The method of claim 23, the data sanitization process further comprising:
  generating the attestation by instructing the memory device to provide the attestation; and
  instructing the memory device to produce the first thumbprint and the second thumbprint and include the first thumbprint and the second thumbprint in the attestation.

25. The method of claim 23, the data sanitization process further comprising:
  directing the memory device to sign the attestation using a second private key of the memory device; and
  signing the attestation includes signing the attestation received from the memory device using the first private key.

* * * * *